United States Patent [19]

Fitch et al.

[11] 4,019,577

[45] Apr. 26, 1977

[54] THERMAL ENERGY PRODUCTION BY IN SITU COMBUSTION OF COAL

[75] Inventors: John L. Fitch, Dallas; Malcolm K. Strubhar, Irving, both of Tex.

[73] Assignee: Mobil Oil Corporation, New York, N.Y.

[22] Filed: Feb. 23, 1976

[21] Appl. No.: 660,079

[52] U.S. Cl. .............................. 166/259; 166/280; 166/50; 165/45
[51] Int. Cl.² ...................................... E21B 43/24
[58] Field of Search ............ 166/259, 57, 271, 272, 166/261, 280, 308, 50; 165/45

[56] References Cited

UNITED STATES PATENTS

| | | | |
|---|---|---|---|
| 2,497,868 | 2/1950 | Dalin | 166/256 |
| 2,584,605 | 2/1952 | Merriam et al. | 166/258 X |
| 2,695,163 | 11/1954 | Pearce et al. | 166/261 X |
| 3,034,580 | 5/1962 | Frey et al. | 166/261 |
| 3,298,434 | 1/1967 | Graham | 166/261 X |
| 3,599,714 | 8/1971 | Messman et al. | 166/258 |
| 3,709,300 | 1/1973 | Pye | 166/280 |
| 3,809,159 | 5/1974 | Young et al. | 166/258 |
| 3,863,709 | 2/1975 | Fitch | 166/271 X |
| 3,896,877 | 7/1975 | Vogt, Jr. et al. | 166/280 X |
| 3,933,447 | 1/1976 | Pasini et al. | 166/259 X |

*Primary Examiner*—Stephen J. Novosad
*Attorney, Agent, or Firm*—C. A. Huggett; Henry L. Ehrlich

[57] ABSTRACT

This specification discloses a method of recovering thermal energy from a coal formation having a preferred vertical fracture orientation. An injection well and a production well are provided to extend into the coal formation and a vertical fracture is formed by hydraulic fracturing techniques and propagated into the coal formation to communicate with both the wells. The vertical fracture is propped in the lower portion only. A combustion-supporting gas is injected into the propped portion of the fracture and the coal is ignited. Injection of the combustion-supporting gas is continued to propagate a combustion zone along the propped portion of the fracture and hot product gases generated at the combustion zone are produced to recover the heat or thermal energy of the coal. Water may also be injected into the fracture to transport the heat resulting from the combustion of the coal to the production well for recovery.

12 Claims, 3 Drawing Figures

THERMAL ENERGY PRODUCTION BY IN SITU COMBUSTION OF COAL

BACKGROUND OF THE INVENTION

This invention is directed to a method of recovering thermal or heat energy of a subterranean coal formation by burning the coal in situ and transporting the generated heat to the earth's surface.

Coal has long been used as a fuel and represents a large percent of the proven reserves of all of the earth's fossil fuels. Coal is burned directly as a fuel and has also been gasified to produce flammable gas. Gasification of coal has often been carried out at the earth's surface. This requires that coal be mined and transported to the gasification site. Techniques have also been taught for burning and gasification of coal in situ to produce flammable gases and coal tar liquids.

In U.S. Pat. No. 3,628,929 to Eugene D. Glass and Vaughan W. Rhoades there is described a method for the production of flammable gas and coal tar liquids by the in situ combustion of a coal bed. The process consists of completing wells in the coal seam, creating a horizontal fracture in the coal seam to establish communication in the wells, igniting the coal about the injection well, injecting a combustion-supporting gas, and recovering volatile liquids at the the production well. The injection wells are cased and cemented to the center of the coal layer to enhance the fracturing operation. The formation of a horizontal fracture within the coal bed is an essential criterion of the process for success of the entire operation. The fracture is initiated as close to the center of the coal bed within the injection well as feasible and propagated through the bed to intersect the surrounding production wells. A hydraulic fracturing technique is discussed for creating the horizontal fracture. It is pointed out that though it is common practice to separate a fractured network by the use of propping agents, that in the combustion of a coal seam propping agents should not be used. Propping agents would tend to coagulate the coal tar products produced in the production of a coal seam and block the fracture. A preferred method is described whereby water is simultaneously injected with the combustion-supporting gas to control the temperature of the flame front and to adjust the calorific value of the produced gas. A water-gas shift reaction takes place at the site of the combustion front and yields a considerably enhanced calorific content produced gas.

In U.S. Pat. No. 3,775,073 to Vaughan W. Rhoades there is described another technique for the in situ combustion of a coal seam to recover flammable gases and coal tar liquids. Wells are completed in a coal seam and a horizontal fracture is created in the coal seam to establish communication between the wells. A first combustion-supporting gas is ignited within the horizontal fracture so as to form a horizontal and vertical fractured network between the wells. A second combustion-supporting gas is injected to propagate the combustion front through the coal about the injection well and the volatile liquids and combustible gases are recovered at the production well. The formation of a horizontal fracture within the coal bed is considered to be an essential criterion of the invention for success of the entire operation. It is said that the fracture should be initiated as close to the center of the coal bed, within the injection well, as feasible and propagated through the bed of the coal seam so as to intersect the surrounding producing wells.

In U.S. Pat. No. 3,138,203 to Malcolm A. Weiss et al. there is described an in situ combustion method of recovering oil from an underground oil-bearing stratum wherein a burning front is caused to channel toward one or more producing wells, preferentially along the lower boundary of the stratum. An underground burning operation is conducted so as to deliberately cause the combustion front to travel selectively from the input wells to the output wells along the bottom of one or more oil-bearing strata within the reservoir. Techniques described for propagating a combustion front along the lower boundary include opening the input and output wells solely at the bottom of each stratum of interest as by perforating, fracturing, or the like. The fractures may be extended part or all of the way between the input and output wells.

In U.S. Pat. No. 3,520,363 to Charles L. Bauer there is described a process for the recovery of hydrocarbons from subterranean hydrocarbon-bearing formations by conducting an in situ combustion operation prior to water injection. In situ combustion is caused to occur in random pockets in a subterranean formation followed by water injection thereinto to scavenge the generated heat as part of a water drive and thereby produce additional hydrocarbons contained therein.

Techniques wherein subterranean formations are hydraulically fractured to improve the recovery of hydrocarbons from hydrocarbon-bearing formation have been widely used. Further, techniques wherein oil shale formations and coal-bearing formations are hydraulically fractured to improve the recovery of hydrocarbons from these formations have been described.

In U.S. Pat. No. 3,285,335 to Carl E. Reistle, Jr. there is described a method of in situ pyrolysis or recovery of organic carbonaceous materials from subterranean deposits of oil shale. A number of substantially horizontal shafts are drilled though an oil shale formation such that at least a pair of the shafts are in different horizontal planes and generally oriented in the same direction. Fracturing operations are conducted from at least one of the shafts so that the plane of the resulting fracture is vertically disposed so as to open communication between at least a pair of horizontal shafts. A thermal fluid having a temperature sufficient to pyrolyze the oil shale is introduced into the formation along the parted fractured plane whereby the sensible heat of the fluid is transferred to the surrounding oil shale formation and pyrolysis and vaporization of the kerogen content of the oil shale occur. The products of pyrolysis and vaporization are entrained in the thermal fluid and are recovered therewith at the earth's surface. In accordance with another aspect, the preferred fracture orientation in the oil shale formation is determined and the work shaft is drilled into the oil shale formation and from the work shaft a plurality of substantially horizontal shafts are drilled into the formation in order to penetrate the formation at angles not less than 30° and as near as 90° as possible relative to the preferred fracture orientation of the oil shale. The formation is then fractured from at least one of the horizontal shafts to open communication with at least one other of the horizontal shafts and thermal fluid is circulated to pyrolyze the oil shale and conduct the products of pyrolysis to the earth's surface.

In U.S. Pat. No. 3,835,928 to Malcolm K. Strubhar and Edwin E. Glenn, Jr. there is described a method of forming from a deviated well a plurality of vertically disposed fractures spaced a substantial distance apart in a subterranean formation having a known preferred fracture orientation.

In U.S. Pat. No. 3,863,709 to John L. Fitch there is described a method and system for recovering geothermal energy from a subterranean geothermal formation having a preferred vertical fracture orientation wherein at least two deviated wells are provided which extend into the geothermal formation in a direction transversely of the preferred fracture orientation and a plurality of vertical fractures are hydraulically formed to intersect the deviated wells. A fluid is injected via one well into the fractures to absorb heat from the geothermal formation and the heated fluid is recovered from the formation via another well.

In U.S. Pat. No. 3,878,884 to Cecil B. Raleigh there is described a method for producing multiple fractures in earth formations in which the lines of least principal stress deviate substantially from the vertical. It is said that the fracturing method can be used to increase the recovery of gas or oil from low permeability formations and can also be used for in situ recovery of oil from oil shale, or solution mining, or extracting geothermal energy from subterranean formations.

SUMMARY OF THE INVENTION

This invention is directed to a method for recovering heat energy from a subterranean coal formation having a preferred vertical fracture orientation. An injection well and a production well are provided which extend from the surface of the earth and communicate with the coal formation. A vertical fracture is formed and propagated by hydraulic fracturing techniques in the coal formation to communicate with the injection well and the production well and the lower portion only of the vertical fracture is propped. A combustion-supporting gas is injected via the injection well into the lower propped portion of the vertical fracture. The coal is ignited to form a combustion zone and produce hot combustion gases and the injection of the combustion-supporting gas is continued to propagate the combustion zone through the formation. The hot combustion gases are produced into the production well.

DESCRIPTION OF THE PREFERRED EMBODIMENTS

This invention relates to the recovery of thermal energy from a subterranean coal formation having a preferred vertical fracture orientation.

In accordance with this invention there is provided a injection well and a production well which extend from the surface of the earth and penetrate a subterranean coal formation having a preferred vertical fracture orientation. The injection and production wells are provided to penetrate substantially the entire vertical thickness of the coal formation. The formation is fractured by hydraulic fracturing techniques to provide a vertical fracture which extends through the coal formation and communicates with the injection and the production wells. The lower portion of the vertical fracture is propped leaving the upper portion thereof unpropped. Thereafter, in situ combustion is initiated in the coal formation about the propped portion of the fracture and a combustion zone is propagated through the formation. The hot product or combustion gases produced at the combustion zone are flowed through the formation and are produced to recover the heat or thermal energy of the coal. In accordance with an embodiment a fluid is injected into the lower packed portion of the fracture and flowed therethrough to the production well to absorb the heat generated by the combustion of the coal. The heated fluid and hot combustion gases are produced to recover the heat energy of the coal. Water is a preferred fluid because of its ready availability at economical costs, high heat capacity, and ease of handling. Hereafter for simplicity in describing this invention, when reference is made to the use of water it is to be understood that this term incorporates any fluid which may be used to absorb the heat generated by the combustion of the coal.

Figure 1:
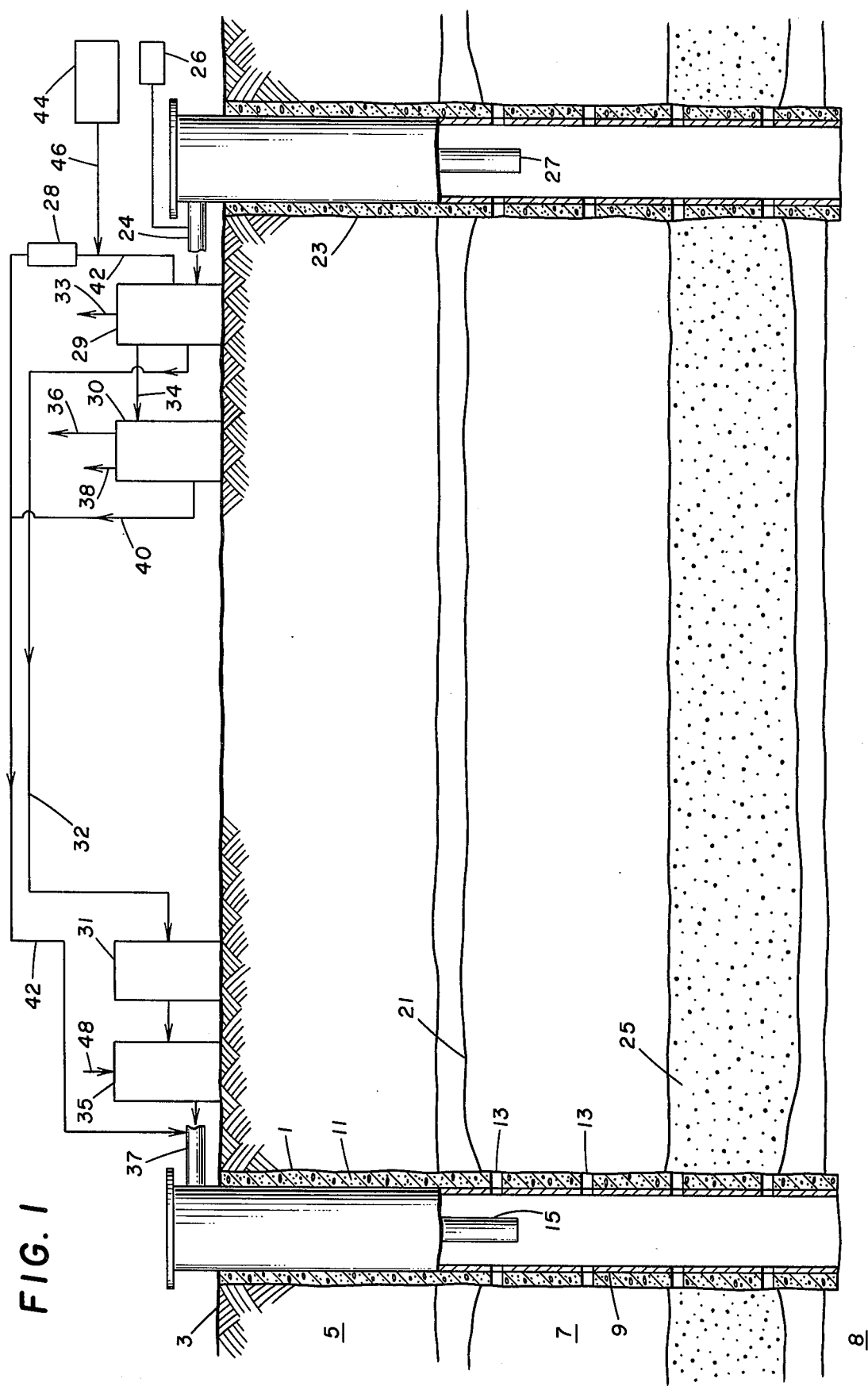
FIG. 1 is a schematic view of an injection well and a production well penetrating a coal formation illustrating the invention.

Referring now to FIG. 1 there is shown an injection well 1 and a production well 23 which extend from the surface of the earth 3 through a overburden 5 and penetrate a subterranean coal formation 7 having a preferred vertical fracture orientation. A formation 8 is shown underlying the coal formation 7. The injection and production wells may be completed similarly. With reference to the injection well 1 and illustrative of the completion of both the injection and production wells, there is shown a casing string 9 that is cemented in place by a cement sheath 11. The wells 1 and 23 are shown to penetrate substantially the entire thickness of the coal formation 7 and perforations 13 are provided to extend through the casing 9 and cement sheath 11 to establish fluid communication intermediate the injection well and the coal formation 7. A tubing string 15 is provided in the injection well 1 to establish fluid communication intermediate the lower portion of the well and the upper portion thereof and the surface of the earth 3. A similar tubing string 27 is provided in the production well 23. A vertical fracture 21 extends through the coal formation 7 and communicates with the injection well 1 and a production well 23.

The vertical fracture 21 may be formed by injecting a fracturing fluid down the tubing 15 and into communication with the coal formation 7 through the perforations 13. A packer may be provided (not shown) in the annulus formed intermediate the tubing string 15 and casing 9 at about the location of the interface between the overburden 5 and the coal formation 7 to isolate the coal formation from the annulus thereabove. Hydraulic pressure is applied to the fracturing fluid to fracture the formation and form the vertical fracture 21. Propping material is included in the fracturing fluid in an amount to provide a propped lower portion 25 of the vertical fracture. The propping material included in the fracturing fluid should be in an amount no more than that which is sufficient to prop the lower one-third portion of the vertical fracture 21. Thus, the fracture 21 is propped in that lower portion 25 to provide a high permeability fracture while the upper portion of the fracture 21 essentially closes above the propped portion. Desirably, a relatively low viscosity fracturing fluid is used and is displaced into the formation at a relatively high injection rate in forming the vertical fracture. This permits the propping material to settle from the fracturing fluid and from a proppant bed at the bottom of the fracture and thereby prop the lower portion thereof. The bed height can further be controlled by designing the concentration of the propping material in the fracturing fluid and by selecting the size of the propping material. Sand is commonly used as a proppant. It is desirable to use relatively coarse sand, 20 to 40 mesh or larger, to provide relatively high permeability in the proppant bed.

A combustion-supporting gas such as air or oxygen is injected down the injection well 1 and through the propped portion 25 of the vertical fracture 21. The coal is ignited and the injection of the combustion-supporting gas is continued to propagate a combustion zone through the coal formation along the propped portion of the fracture. The coal may be ignited for example by use of chemical or electrical ignition means. The coal may be ignited at the injection well 1 and forward in situ combustion carried out or ignited at the production well 23 and reverse in situ combustion carried out as desired. By propping the lower portion only of the vertical fracture 21, a high permeability channel is provided in the lower portion of the fracture and burning progresses initially along this channel. As burning progresses, ash forms and falls into the lower propped portion of the fracture, exposing fresh coal above, thereby providing for burning to progress uniformly upward through the coal formation. Water is injected via the injection well 1 into the fracture 21 and is flowed therethrough to the production well 23. The water is injected in an amount to optimize the recovery of the heat resulting from the combustion of the coal. The water is heated by the combustion zone and by the hot formation the results from the combustion of the coal and is converted primarily to steam. The steam, hot water, and combustion gases are produced via the production well 23 to the surface of the earth thereby making available for ready use the heat energy of the coal. These may be produced via the tubing string 27 in the production well 23. The steam, hot water, and combustion gases may contain corrosive gases and foreign matter making their direct use difficult and troublesome. Therefore, desirably they are flowed from the production well 23 via flow path 24 to a heat exchanger 29 where the heat from the coal is recovered for use. The heat energy may then be delivered as illustrated by path 32 to a power plant 31 and there utilized for generating power. The waste gases may be vented from the heat exchanger via a gas vent 33. Water from the heat exchanger 29 may be flowed via line 42 to a pump 28 and injected via a conduit 37 into the injection well 1 and recycled to absorb more heat from the coal formation. Make-up water may be flowed from a water supply 44 via a line 46 and into the line 42 for injection into the injection well 1. Air 48 or other combustion-supporting gas is compressed by a compressor 35 and injected via the conduit 37 into the injection well 1 and thence into the coal formation 7.

A means 26 for monitoring the heat content of the produced product gases and steam may be connected with the flow path 24. Desirably the means 26 is located in close proximity to the heat exchanger 29. The means for monitoring the heat content of the produced product gases and steam may be, for example, a temperature measuring device, a gas analysis device, a gas specific gravity measuring device, or any combination thereof. By monitoring the heat content of the produced product gases and steam the over all efficiency of the recovery process may be optimized by controlling the injection of the combustion-supporting gas and water into the coal formation.

An alternative way of monitoring the heat content of the produced product gases and steam thereby enabling the optimization of the recovery process is by monitoring the output of the heat exchanger. Monitoring the output of the heat exchanger for such things as temperature, pressure and flow rate may readily be done and indirectly gives a monitor of the heat content of the produced product gases and steam.

Along with the combustion gases, steam and hot water that are produced from the coal formation there are also produced combustible gases such as methane, carbon monoxide, and hydrogen. It may be desirable to recover these combustible gases, particularly in the case where a forward in situ combustion process is carried out. Thus, the heat exchanger 29 may be connected via a line 34 to a recovery separator 30 and the combustible gases there separated for distribution via a conduit 36 to storage or to a point for current use (not shown). The recovery separator 30 may also have a vent 38 and may be connected via line 40 to the line 42 for delivering any recovered water to the conduit 37 for injecting into the injection well 1 and recycling through the coal formation to absorb heat therefrom.

Figure 3:
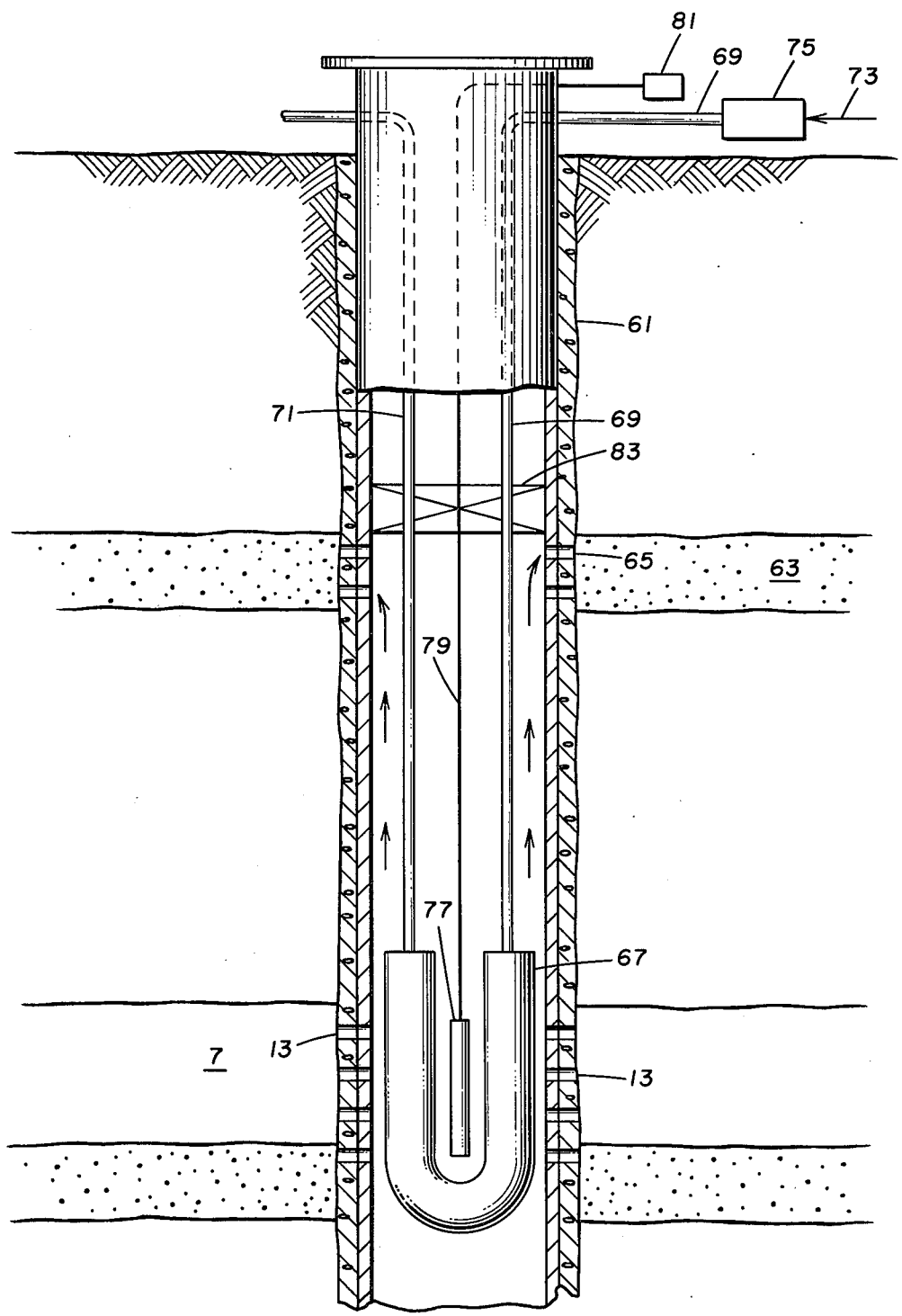
FIG. 3 is a schematic view of a production well having a heat exchanger located downhole illustrating a further embodiment of the invention.

In accordance with another embodiment of this invention, the heat exchanger rather than being located at the surface of the earth is located downhole in the vicinity of the coal formation and thus in the region of the production well which is exposed to the highest temperatures produced by the burning of the coal. Thus, the heat resulting from the combustion of the coal is recovered by the downhole heat exchanger and is conducted to the surface of the earth in form readily usable there. This embodiment is described in more detail by reference to FIG. 3 where there is shown a production well 61 similar to the production well 23 of FIG. 1 but completed in a different manner. The production well 61 penetrates the coal formation 7 and communicates therewith through perforations 13. The production well 61 also penetrates and communicates through perforations 65 with an overlying permeable formation 63 having a formation pressure sufficiently low to permit the flow of combustion products from the well 61 thereinto. A downhole heat exchanger 67 is shown positioned in the lower part of the well 61 in the vicinity of the coal formation 7. The downhole heat exchanger 67 may take the form of any suitable heat exchanger for positioning downhole in the well but is illustrated as being of the type which is connected to the surface via an inlet tubing 69 and an outlet tubing 71. Water, from a source not shown, is flowed as illustrated by 73, into a pump 75 and pumped via the inlet tubing 69 down the well 61 and into the heat exchanger 67. There the water is converted into steam by the heat resulting from the combustion of the coal formation 7 which heat flows with the steam and combustion products from formation 7 into the production well 61 as previously described. The steam is flowed from the heat exchanger 67 up the outlet tubing 71 to the surface of the earth where it may be utilized.

In accordance with still another embodiment, the combustible products formed as a result of the burning of the coal as previously described are ignited and burned in the interior of the production well 61 in the vicinity of the heat exchanger 67 to further utilize the heat capacity of the coal formation 7. The combustible products may be ignited in that portion of the well 61 near the heat exchanger 67 by activating an igniter 77. The igniter 77 may be, for example, and electrical igniter connected by electrical cables as illustrated by the cable 79 which leads upward from the electrical igniter 77 to the surface of the earth where it is connected to a voltage source 81. The combustion products may be disposed of by injecting into the permeable formation 63 as opposed to being produced to the surface of the earth where they must further be handled and disposed of. A packer 83 is illustrated as being set in the well above the permeable formation 63 to force the combustion gases to be flowed through the perforations 65 into the permeable formation 63. Should further combustion-supporting gas be needed in the vicinity of the heat exchanger 67 to facilitate the burning of the combustible products, this combustion-supporting gas may be provided by running a string of tubing from the surface of the earth (not shown) to the vicinity of the downhole heat exchanger 67 and injecting under pressure the combustion-supporting gas into the string of tubing and conducting the gas to the vicinity of the downhole heat exchanger.

Downhole heat exchangers suitable for such use are known in the art. For example, in U.S. Pat. No. 3,470,943 to Allen T. Van Huisen there is shown a downhole heat exchanger which is disclosed for use in the recovery and utilization of geothermal energy. Other downhole heat exchangers are shown in U.S. Pat. Nos. 2,438,720 and 3,274,769.

In accordance with another aspect of this invention, the injection well and the production well are deviated such that they penetrate the coal formation in an azimuth direction transversely to the preferred vertical fracture orientation of the coal bed and preferably normal to the preferred fracture orientation. The injection and production wells are located with respect to each other such that upon creating a vertical fracture from either of the wells and propagating the fracture into the coal formation along the preferred vertical fracture orientation the vertical fracture will intersect the other well. The use of this aspect of the invention greatly facilitates the formation and propagation of a vertical fracture to provide communication with two spaced apart wells. In accordance with still another aspect of this invention there are formed a plurality of essentially parallel and vertical fractures in the formation, which vertical fractures communicate with the deviated injection and production wells. A more detailed description of such a technique for forming a plurality of essentially parallel and vertical fractures which communicate with deviated injection and production wells is found in the previously mentioned U.S. Pat. No. 3,835,928 to Strubhar and Glenn and U.S. Pat. No. 3,863,709 to Fitch.

Figure 2:
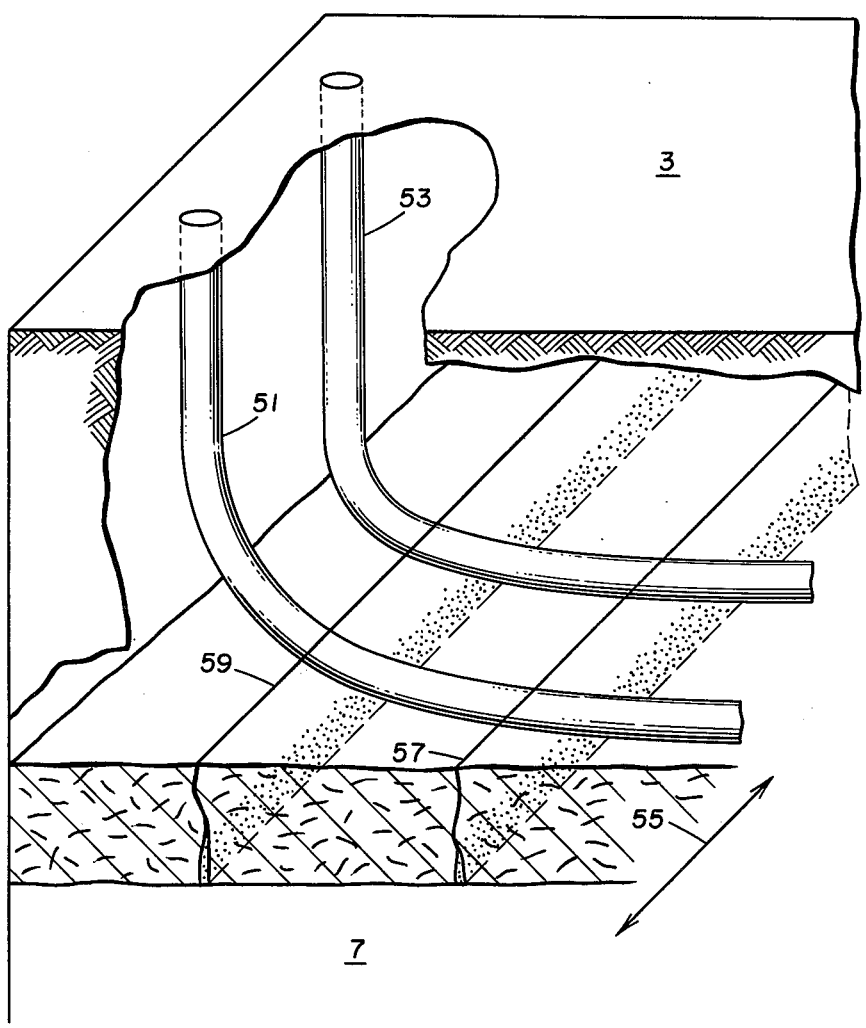
FIG. 2 is a schematic view of a deviated injection well and production well penetrating a coal formation illustrating another embodiment of the invention.

These aspects of the invention are further illustrated by reference to FIG. 2. There an injection well 51 and a production well 53 are shown extending from the surface of the earth 3 into a subterranean coal formation 7 having a preferred vertical fracture orientation as illustrated by 55. There two vertical fractures, a vertical fracture 57 and a vertical fracture 59, are shown as may be formed using hydraulic fracturing techniques in the coal formation 7 such that the fractures communicate with the injection well 51 and the production well 53. The vertical fractures are propped in the lower portion thereof as previously described. Thereafter the coal is burned in situ and the heat energy thereof is recovered, as previously described. In FIG. 2, for simplicity, only two deviated wells and two vertical fractures are shown as illustrative of a plurality of wells and fractures. It will be beneficial many times however to use more than two wells as well as more than two vertical fractures. For example, it will normally be beneficial to utilize another deviated production well (not shown) spaced laterally from the injection well 51 and on the side opposed to the production well 53 to communicate with the vertical fractures formed in the formation 7 such that heat may be recovered from the burning of the coal along the extensions of the vertical fractures on both sides of the injection well 51.

We claim:

1. A method for recovering heat energy from a subterranean coal formation having a preferred vertical fracture orientation, comprising:
   a. providing an injection well and a production well which extend from the surface of the earth and communicate with said coal formation;
   b. forming by hydraulic fracturing techniques a vertical fracture in said coal formation to communicate with said injection well and said production well;
   c. propping the lower portion of said vertical fracture to a height of no more than one-third the height of said fracture and leaving unpropped the upper portion thereof to provide high permeability in the propped portion only of the fracture;
   d. injecting a combustion-supporting gas via said injection well into said lower propped portion of said vertical fracture;
   e. igniting said coal to form a combustion zone about said lower propped portion of said vertical fracture and to generate hot combustion gases;
   f. continuing to inject said combustion-supporting gas to propagate said combustion zone through said formation along the propped portion of the fracture; and
   g. producing said hot combustion gases into said production well to recover the heat energy contained thereby.

2. The method of claim 1 further comprising:
   1. injecting via said injection well and into said lower packed portion of said fracture a fluid to absorb heat generated by the combustion of said coal formation, and
   2. continuing to inject said fluid into said fracture in an amount sufficient to effectively absorb and transport said heat into said production well for recovery thereof.

3. The method of claim 2 wherein said fluid is water.

4. The method of claim 3 wherein said injection well and said production well are deviated wells which penetrate said coal formation in a direction transversely of said preferred fracture orientation.

5. The method of claim 4 wherein a plurality of vertical fractures are formed spaced laterally one from the other to provide communication intermediate said injection well and said production well and wherein said fluid that is injected to absorb heat is water.

6. The method of claim 1 wherein said combustion zone is propagated through said formation from said injection well toward said production well.

7. The method of claim 1 wherein said combustion zone is propagated through said formation from said production well toward said injection well.

8. A method for recovering heat energy from a subterranean coal formation having a preferred vertical fracture orientation, comprising:
   a. providing an injection well and a production well which extend from the surface of the earth and communicate with said coal formation;
   b. fracturing by hydraulic fracturing techniques said coal formation to provide a vertical fracture which communicates with said injection well and said production well;
   c. propping the lower portion of said vertical fracture to a height of no more than one-third the height of said fracture and leaving unpropped the upper portion thereof to provide high permeability in the propped portion only of the fracture;
   d. injecting a combustion-supporting gas via said injection well into said lower propped portion of said vertical fracture;
   e. igniting said coal to form a combustion zone about said lower propped portion of said vertical fracture and to generate hot combustion gases including combustible gases;
   f. continuing to inject said combustion-supporting gas to propagate said combustion zone through said formation;
   g. locating a heat exchanger in said production well;
   h. producing said hot combustion gases including combustible gases into said production well to heat said heat exchanger and thereby heat a heat exchanger fluid; and
   i. producing said heat exchanger fluid up said well to the surface of the earth.

9. The method of claim 8 further comprising injecting a fluid to absorb heat generated by the combustion of said coal formation via said injection well into said lower packed portion of said fracture and flowing said fluid into said fracture in an amount sufficient to effectively absorb and transport said heat into said production well to recover the heat energy therefrom.

10. The method of claim 9 further comprising circulating water from the surface of the earth down said production well and into said heat exchanger whereby said water is converted into steam and producing said steam up said production well to the surface of the earth.

11. The method of claim 10 further comprising igniting said combustible gases in the vicinity of said downhole heat exchanger to further heat said heat exchanger.

12. The method of claim 11 further comprising flowing said combustion products up said production well and into a permeable subterranean formation for disposal.

* * * * *